(12) United States Patent
Davis et al.

(10) Patent No.: US 6,622,069 B1
(45) Date of Patent: Sep. 16, 2003

(54) AUTOMATIC MOTOR ADJUSTMENT FOR DIFFERENTIALLY STEERED DUAL ELECTRIC MOTOR SYSTEM

(75) Inventors: Marc R. Davis, Dublin, CA (US); Andrew J. Shepherd, Danville, CA (US); Michael Bachman, San Ramon, CA (US)

(73) Assignee: Curtis Instruments, Inc., Livermore, CA (US)

( * ) Notice: Subject to any disclaimer, the term of this patent is extended or adjusted under 35 U.S.C. 154(b) by 0 days.

(21) Appl. No.: 10/150,292

(22) Filed: May 7, 2002

Related U.S. Application Data

(60) Provisional application No. 60/289,639, filed on May 5, 2001.

(51) Int. Cl.[7] .................. B60L 11/00; G05D 1/00; G05D 3/00; G06F 7/00; G06F 19/00
(52) U.S. Cl. .................. 701/22; 180/65.5; 180/308; 475/5; 318/139
(58) Field of Search .................. 701/22, 41, 70, 701/71, 72; 180/65.5, 65.1, 8.1, 8.3, 308, 305; 475/5; 318/139

(56) References Cited

U.S. PATENT DOCUMENTS

| | | | | |
|---|---|---|---|---|
| 4,387,325 A | * | 6/1983 | Klimo | 318/71 |
| 5,163,170 A | * | 11/1992 | Grabowski | 318/113 |
| 5,451,852 A | * | 9/1995 | Gusakov | 318/611 |
| 5,453,930 A | * | 9/1995 | Imaseki et al. | 701/22 |
| 5,481,460 A | * | 1/1996 | Masaki et al. | 701/50 |
| 5,701,062 A | * | 12/1997 | Barrett | 318/51 |
| 6,054,844 A | * | 4/2000 | Frank | 322/16 |
| 6,321,866 B1 | * | 11/2001 | Prohaska | 180/307 |
| 6,387,007 B1 | * | 5/2002 | Fini, Jr. | 475/268 |

* cited by examiner

*Primary Examiner*—Thomas G. Black
*Assistant Examiner*—Ronnie Mancho
(74) *Attorney, Agent, or Firm*—Beyer Weaver & Thomas LLP

(57) ABSTRACT

Methods and apparatus for adjusting at least one of the motors in an electrically driven vehicle having a first motor for controlling a first wheel and a second motor for controlling a second wheel are disclosed. The method is performed in response to input from a user control that enables an operator of the vehicle to steer the vehicle. It is determined from one or more conditions whether the operator of the vehicle is attempting to drive the vehicle straight on approximately level ground. When it is determined from the one or more conditions that the operator of the vehicle is attempting to drive the vehicle approximately straight on approximately level ground, it is then determined whether to adjust one of the motors based upon the input from the operator of the vehicle to the user control. When it is determined that adjustment is appropriate, the appropriate motor is adjusted.

54 Claims, 4 Drawing Sheets

AUTOMATIC MOTOR ADJUSTMENT FOR DIFFERENTIALLY STEERED DUAL ELECTRIC MOTOR SYSTEM

CROSS REFERENCE TO RELATED APPLICATIONS

This application claims priority of provisional U.S. patent application Ser. No. 60/289,639, filed May 5, 2001, entitled "Automatic Motor Adjustment for Differentially Steered Dual Electric Motor System" which is incorporated by reference.

BACKGROUND OF THE INVENTION

1. Field of the Invention

The present invention relates to vehicles in which two or more driven wheels are each connected to an individual electric motor yet driven by a single controller. More particularly, the present invention relates to methods and apparatus for adjusting one or more motors in response to the detection of one or more conditions that indicate that the operator of the vehicle is attempting to drive the vehicle straight on approximately level ground.

2. Description of the Related Art

Electric vehicles such as power chairs and electrically driven wheel chairs have traditionally been manufactured with two wheels, each typically driven by a separate motor. Therefore, two different motors function to separately control a left and a right wheel. A user control such as a throttle or joystick is traditionally used to operate such a vehicle. User movements that are input via the user control are then converted into voltages by a motor controller. These voltages are then used to drive the left and right motors so that the left and right wheels rotate and cause the vehicle to advance in a desired direction. For example, when a user wishes to turn the vehicle left, the motor controller will interpret the movement in the user control and convert the position of the user control into voltages that control the wheels such that the voltage provided to the left wheel is less than the voltage provided to the right wheel.

When a user pushes a user control such as a joystick, he or she expects the desired movement to control the vehicle in an expected manner. For example, when the user pushes the joystick straight ahead, it is expected that the vehicle will drive straight. However, electrical and mechanical differences between the motors that drive the left and right wheels can cause the motors to run at different speeds than expected. As a result, these slight variations present in the two motors, gear boxes or other drive train related components can cause the vehicle to drive in an unexpected, unpredictable, and undesirable manner.

In order to compensate for such disparities between drive train related components, gear boxes, and/or driving motors, the motors are typically tested when they are received from the assembly line at the manufacturer of the vehicle. At this time, the manufacturer uses this testing to identify well-matched pairs of drive train related components (e.g., motors). However, this testing process is a costly and time-consuming one. Moreover, even closely matched motors will display differences in operating characteristics (e.g., reduction in motor speed) due to electrical and mechanical differences. A handheld programmer is therefore typically used to adjust a "trim" parameter that accounts for such differences. In other words, this "trim" parameter compensates for differences between the motors present upon initial production. However, it is important to note that this "trim" parameter is a permanent, fixed parameter.

Although the "trim" parameter compensates initially at "production time" for differences between motors, motor operating characteristics can change over time. For example, a commonly used motor technology is brush direct current (DC) motors. These brushes are applied with pressure to provide voltage to the motor. However, these brushes wear over time and therefore the characteristics of the brushes change, which can reduce the voltage that is provided to the motor. Unfortunately, the fixed "trim" parameter that is traditionally used to compensate for variations in the electrical components cannot compensate for changes in those components that occur over time.

Another difference between motor operating characteristics that cannot be compensated for during original production of the vehicle occurs when one of the motors is replaced. It is not uncommon for a motor to fail mechanically. When a motor needs to be replaced, the vehicle is brought to a dealer to replace the nonfunctioning motor. However, unlike the original manufacturer, the dealer does not have the resources or the capability to reset or modify the trim parameter that was fixed by the manufacturer of the vehicle.

Similarly, motor operating characteristics can change over time as a result of motor or vehicle use. For example, when one of the tires loses air, this creates a drag on the tire and associated wheel. As another example, the operating characteristics of gear boxes can also change over time. Since the trim parameter is a fixed, static parameter that is established during production of the vehicle, the trim parameter no longer compensates for mechanical and electrical differences between the motors. Unfortunately, many repair centers do not have the capability to reset the trim parameter.

Even characteristics of the individual operating the vehicle can effect the way that motors operate. For example, a heavy person who slouches may put greater pressure on one of the wheels. However, a trim variable that is fixed at production cannot compensate for operating characteristics that vary over time that result from motor use, vehicle use, or characteristics that are unique to the individual operating the vehicle.

Since a trim variable is a static variable fixed at production time, an individual must typically compensate for undesirable operating conditions that occur after the vehicle is purchased. For instance, when operation of one of the motors deteriorates gradually over time, the operator of the vehicle must actively and continually compensate for the offending motor by modifying the input to the user control. Moreover, since a user must be proactive in reacting and compensating for such conditions, a user must be mentally and physically capable of responding adequately to such conditions. Unfortunately, many individuals who use wheelchairs or other electrically operated vehicles do not have the sufficient physical abilities to react in an accurate and timely manner when a vehicle fails to operate in a desired manner. Accordingly, responsiveness of such a vehicle to an operator of the vehicle is unpredictable as well as unsafe.

In view of the above, it would be beneficial if a mechanism were created to compensate for motor or vehicle operating characteristics that vary over time or otherwise occur after initial production of the vehicle. Similarly, it would be desirable if a mechanism were capable of compensating for uneven burdens on the vehicle created by the operator of the vehicle. Moreover, it would be beneficial if such compensating mechanisms could be implemented through modifications made dynamically to a trim variable during operation of the vehicle.

SUMMARY OF THE INVENTION

Methods and apparatus for adjusting at least one of the motors in an electrically driven vehicle having a first motor for controlling a first wheel and a second motor for controlling a second wheel are disclosed. The method is performed in response to input from a user control that enables an operator of the vehicle to steer the vehicle. More particularly, it is determined from one or more conditions whether the operator of the vehicle is attempting to drive the vehicle straight on approximately level ground. When it is determined from the one or more conditions that the operator of the vehicle is attempting to drive the vehicle approximately straight on approximately level ground, it is then determined whether to adjust one of the motors based upon the input from the operator of the vehicle to the user control. When it is determined that adjustment is appropriate, the appropriate motor is adjusted.

Various conditions may be used to determine when the operator of the vehicle is attempting to drive the vehicle straight on approximately level ground. One condition is based upon the amount of adjustment of a user control by the operator of the vehicle, which may be determinative of the intention of the operator of the vehicle. In order to represent the positions of the user control, a traditional (x,y) coordinate system may be used where the user control is in a steady state at the origin of the coordinate system. Thus, the amount that the user control is adjusted along an x-axis may indicate a modification of a direction in which the vehicle is driven as well as an attempt to drive the vehicle straight (e.g., when the amount of adjustment is less than a threshold value). Similarly, an amount that the user control is adjusted along a y-axis may indicate a speed that the operator of the vehicle has selected. For example, when the operator of the vehicle extends the user control to its maximum length along the y-axis, this may indicate that the operator of the vehicle intends to proceed at maximum speed. Vehicle drivers typically proceed at maximum speed when they are driving approximately straight.

Another condition includes determining motor currents and motor speeds. The motor speeds and motor currents may be determinative of a variety of circumstances. For instance, different motor currents may indicate differing loads on the motors due to unlevel ground or uneven weight distribution within the vehicle.

Even when the operator of the vehicle is attempting to drive the vehicle straight on approximately level ground, motor adjustment may not be necessary. A determination whether adjustment is necessary is made based upon the input from the operator of the vehicle to the user control. For instance, positioning of the user control along the x-axis may indicate the amount of correction that may be required. This amount may then be compared with a threshold value (e.g., margin of error) to determine whether adjustment is appropriate or necessary.

Adjustment of the motors may be performed in a variety of ways. For instance, adjustment may include adjusting an input to one of the motors (e.g., voltage applied) to reduce the speed of the motor. The amount that a motor is adjusted may vary on a case-by-case basis or, alternatively, the amount that a motor is adjusted may be a predetermined amount that is applied in every case. Adjustment is preferably performed dynamically and automatically based upon the detection of one or more conditions and in response to input obtained from the operator of the vehicle. However, adjustment may also be initiated or performed manually by the operator of the vehicle in response to the notification of one or more conditions that indicate motor adjustment is desirable.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention is designed for use in a vehicle in which two or more driven wheels are each connected to a separate electric motor. As will be described with reference to the following figures, a mechanism is disclosed for dynamically adjusting at least one of the motors in a motor drive system having two or more electric motors. More particularly, the present invention enables adjustment of one or more motors in response to one or more detected conditions.

The present invention enables characteristics that interfere with the operation of a vehicle to be compensated for without requiring the operator of the vehicle to activate or control the mechanism that dynamically compensates for these characteristics. Such characteristics that prevent a vehicle from being driven in a desired manner by the operator of the vehicle include motor and vehicle operating characteristics that vary over time or otherwise occur after initial production of the vehicle. Such characteristics may include characteristics of the operator of the vehicle (e.g., uneven burdens created by the operator of the vehicle) as well as characteristics of the vehicle or one or more motor(s) that drive the vehicle. As a result, a vehicle may be controlled in an accurate manner by a user control under circumstances, which would typically require a user to continually and consciously modify his or her input to the user control.

Figure 1:
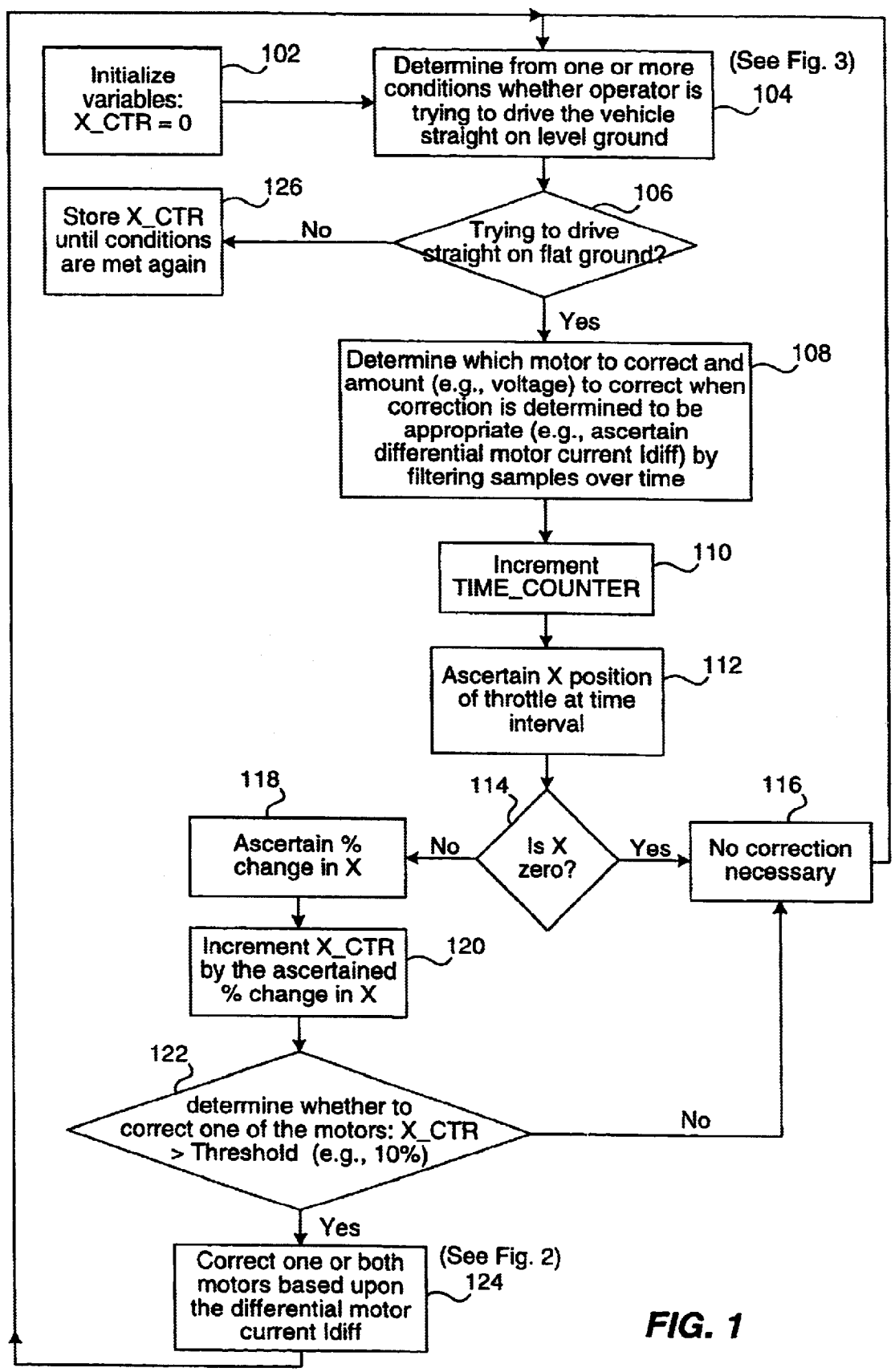
FIG. 1 is a process flow diagram illustrating a method of dynamically adjusting one of the motors in an electrically driven vehicle in response to input from a user control used to steer the vehicle in accordance with an embodiment of the invention.

FIG. 1 is a process flow diagram illustrating a method of dynamically adjusting one of the motors in an electrically driven vehicle in response to input from a user control used to steer the vehicle in accordance with an embodiment of the invention. In order to monitor conditions to ascertain when adjustment of one of the motors is appropriate, various data may be gathered. More particularly, the data that is gathered may be input obtained from the user control as well as data corresponding to various operating conditions of the vehicle.

In accordance with one embodiment of the invention, a counter is maintained during operation of the vehicle and modified in response to operator-input obtained via the user control. Since a user control is typically a control mechanism that is physically movable by the operator of the vehicle (e.g., throttle), the counter is continually modified to indicate one or more positions of the user control over a period of time. In other words, the counter indicates an amount and direction of movement of the user control. More particularly, the counter indicates one or more positions of the user control along the x-axis over a period of time. In accordance with one embodiment of the invention, adjustment of one of the motors is determined to be appropriate or necessary when the counter exceeds a threshold value. More particularly, the threshold value represents a percentage of a maximum value along the x-axis. For instance, the threshold value may represent 10 percent of a maximum x-value (e.g., 10 percent within the "origin" of the x-axis). Thus, when the counter exceeds this range, this may indicate that the operator of the vehicle is attempting to drive the vehicle approximately straight, but the vehicle is not responding within the appropriate margin of error.

As shown at block 102 of FIG. 1, variables used during the dynamic correction process are initialized. More particularly, the counter (e.g., X_CTR) is initialized to zero to indicate that the operator of the vehicle has not attempted to modify a direction in which the vehicle is advancing. The counter is continually modified in response to operator-input obtained via the user control as will be described below.

Next, at block 104 it is determined from one or more conditions whether the operator is attempting to drive the vehicle straight on approximately level ground. These conditions may include, but are not limited to, information obtained from the user input (e.g., directional movement of a throttle) as well as information obtained from the motors (e.g., motor currents and/or speeds). Conditions that are examined in accordance with embodiment of the invention will be described in further detail below with reference to FIG. 3.

When it is determined as shown at block 106 that the operator is attempting to drive the vehicle straight on approximately level ground, it is next determined whether to adjust one of the motors based upon input from the operator of the vehicle to the user control. Such a determination is made as shown with reference to blocks 108–124. In other words, it may be determined from such user input whether the direction and amount which the operator of the vehicle modifies the user control whether the vehicle is operating outside the appropriate margin of error, requiring automatic correction. When it is determined at block 106 that the operator is not attempting to drive the vehicle straight on approximately level ground, the current value of the counter (X_CTR) is stored at block 126. The stored value of the counter (X_CTR) may subsequently be retrieved when the conditions indicating that the operator of the vehicle is attempting to drive straight on approximately level ground are met at a later time during operation of the vehicle.

As described with reference to blocks 108–122, it is determined whether adjustment of one (or both) of the motors is appropriate. This may include determining which one of the motors should be corrected as well as an amount that the motor is to be corrected. As shown at block 108, it is determined which motor to correct and an amount (e.g., voltage) to correct when correction is determined to be appropriate. In accordance with one embodiment, the differential motor current (Idiff) is ascertained, which indicates which motor requires correction as well as the amount to adjust the offending motor. More specifically, the differential motor current is the difference between a current running through the first motor (driving a first wheel) and the current running through the second motor (driving a second wheel). The differential motor current is preferably obtained by sampling the current values over a period of time, thereby obtaining a more accurate differential motor current value.

Since the offending motor has been identified and the amount of correction has been determined, it is next determined at blocks 110 through 122 whether adjustment of one of the motors is appropriate based upon the input from the operator of the vehicle to the user control. As shown at block 110, this process continues automatically and dynamically over time and therefore, a time counter (TIME_COUNTER) may be incremented during this process. Various input values or information obtained from the operator of the vehicle may be used to determine whether adjustment of one or more of the motors is appropriate, as described above. Traditionally, the user control mechanism has been a throttle or other physically movable input device. As a result, the input from the operator of the vehicle will likely be a positioning of the user control. Thus, at block 112, a position of the user control is ascertained. In order to represent the positions of the user control, a traditional (x,y) coordinate system will be used where the user control is in a steady state at the origin of the coordinate system. In other words, the vehicle drives approximately straight when the position of the user control along the x-axis is the origin of the x-axis. Thus, a position of the user control along an x-axis with respect to the origin of the x-axis is ascertained to determine an amount that the user is attempting to turn the vehicle or otherwise modify the direction in which the vehicle is being driven. When the vehicle is working correctly, the position of the user control along the x-axis should be approximately zero (when the operator of the vehicle is attempting to drive straight on approximately level ground).

As described above with reference to block 102, a counter is continually modified to indicate one or more positions of the user control over a period of time. Thus, if the position of the user control along the x-axis is determined at block 114 to be zero, no correction is determined to be necessary at block 116 and the process continues at block 104. However, if the position of the user control along the x-axis is non-zero, the counter is modified at blocks 118 and 120. More particularly, a percentage change in the position of the user control along the x-axis is ascertained at block 118 and the counter (X_CTR) is incremented by this amount at block 120. Thus, the value of the counter X_CTR should be proportional to the total amount that the user control has been moved along the x-axis.

It is next determined at block 122 whether correction of one of the motors is appropriate based upon the input from the operator of the vehicle to the user control. More particularly, the value of the counter X_CTR represents the input from the operator during operation of the vehicle. Thus, the value of the counter X_CTR is compared to a threshold value (e.g., 10% of the maximum value of the x-axis). When the value of the counter X_CTR is less than or equal to the threshold value, this indicates that the vehicle is operating within the appropriate margin of error or that the problem is not large enough to require correction, as shown at block 116. Alternatively, when the value of the counter X_CTR is greater than the threshold value, the degree of manual correction required by the operator of the vehicle exceeds the maximum permissible amount.

When correction of one or more of the motors is determined to be appropriate, correction is performed at block 124. Adjustment of one of the motors may be performed in a variety of ways. For instance, adjustment may include adjusting an input to one of the motors such as a voltage applied to one or both of the motors. In this manner, the speed of one or both of the motors may be adjusted. More particularly, one way in which correction may be performed is based upon the differential motor current (Idiff) that has been sampled during vehicle operation, as described above with reference to block 108. One method of correcting one or more motors based upon the differential motor current will be described in further detail below with reference to FIG. 2.

One problem with dynamic correction is that the conditions may incorrectly indicate that the operator of the vehicle is attempting to drive straight on level ground. For example, the operator of the vehicle may actually be steering the vehicle in a semicircle around a park that surrounds a lake. If correction were continually performed, when the operator of the vehicle subsequently attempted to drive the vehicle straight, the vehicle could be unsafe to drive. As a result, in accordance with one embodiment, the present invention incorporates a safety mechanism, which permits only a single correction per electromechanical brake release.

Figure 2:
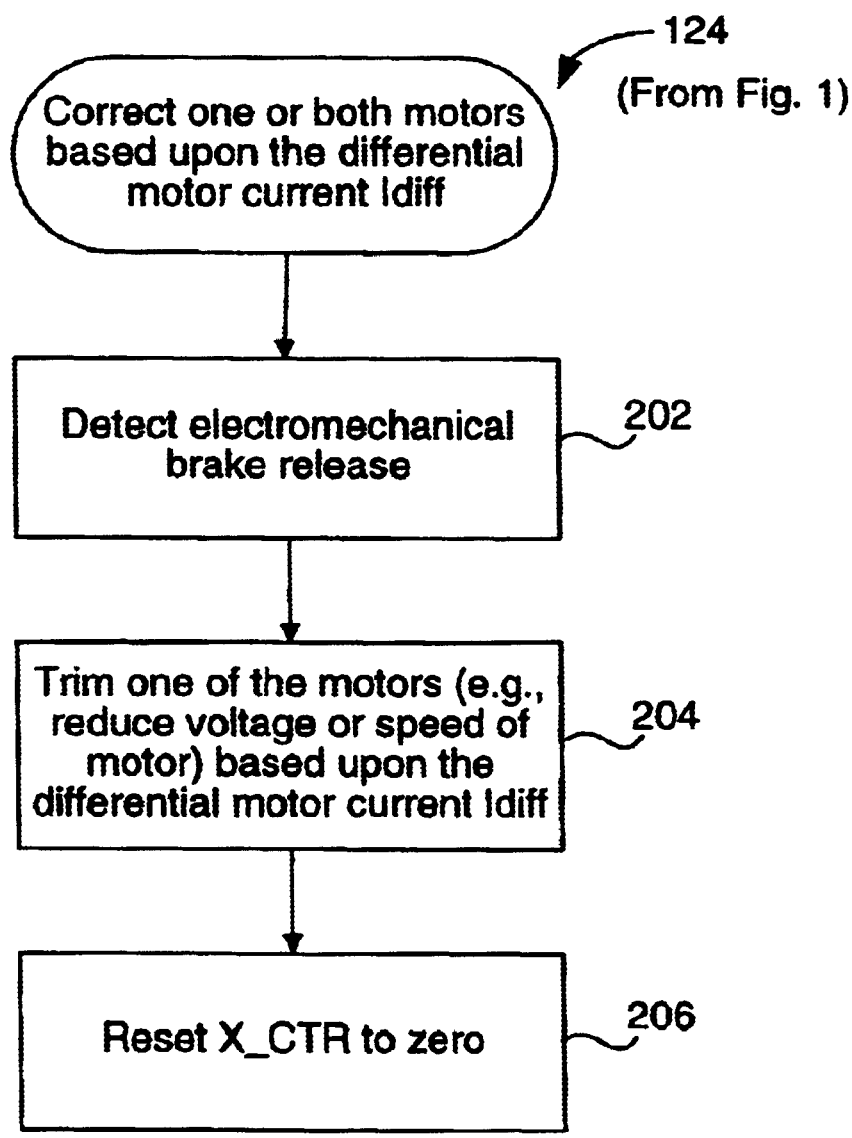
FIG. 2 is a process flow diagram illustrating one method of correcting the motor being adjusted based upon differential motor current as shown at block 124 of FIG. 1.

FIG. 2 is a process flow diagram illustrating one method of correcting the motor being adjusted based upon the differential motor current as shown at block 124 of FIG. 1. When an electromechanical brake release is detected at block 202, the appropriate motor is "trimmed" based upon the differential motor current at block 204. In other words, the motor that is to be corrected is identified based upon the differential motor current (e.g., whether the differential motor current is positive or negative). For example, when the motor current through the first motor is greater than the motor current through the second motor, this indicates that the speed of the first motor should be reduced (e.g., by reducing the voltage applied to the motor). The amount that the first motor is trimmed may be a constant amount (e.g., 1% of maximum speed) or may vary with the differential current amount. However, for safety reasons, a maximum correction amount (e.g., 10%) may be performed in a single trim update. Once the appropriate motor is trimmed by adjusting an input to one of the motors, counter X_CTR is reset to zero to indicate that no correction is required.

Figure 3:
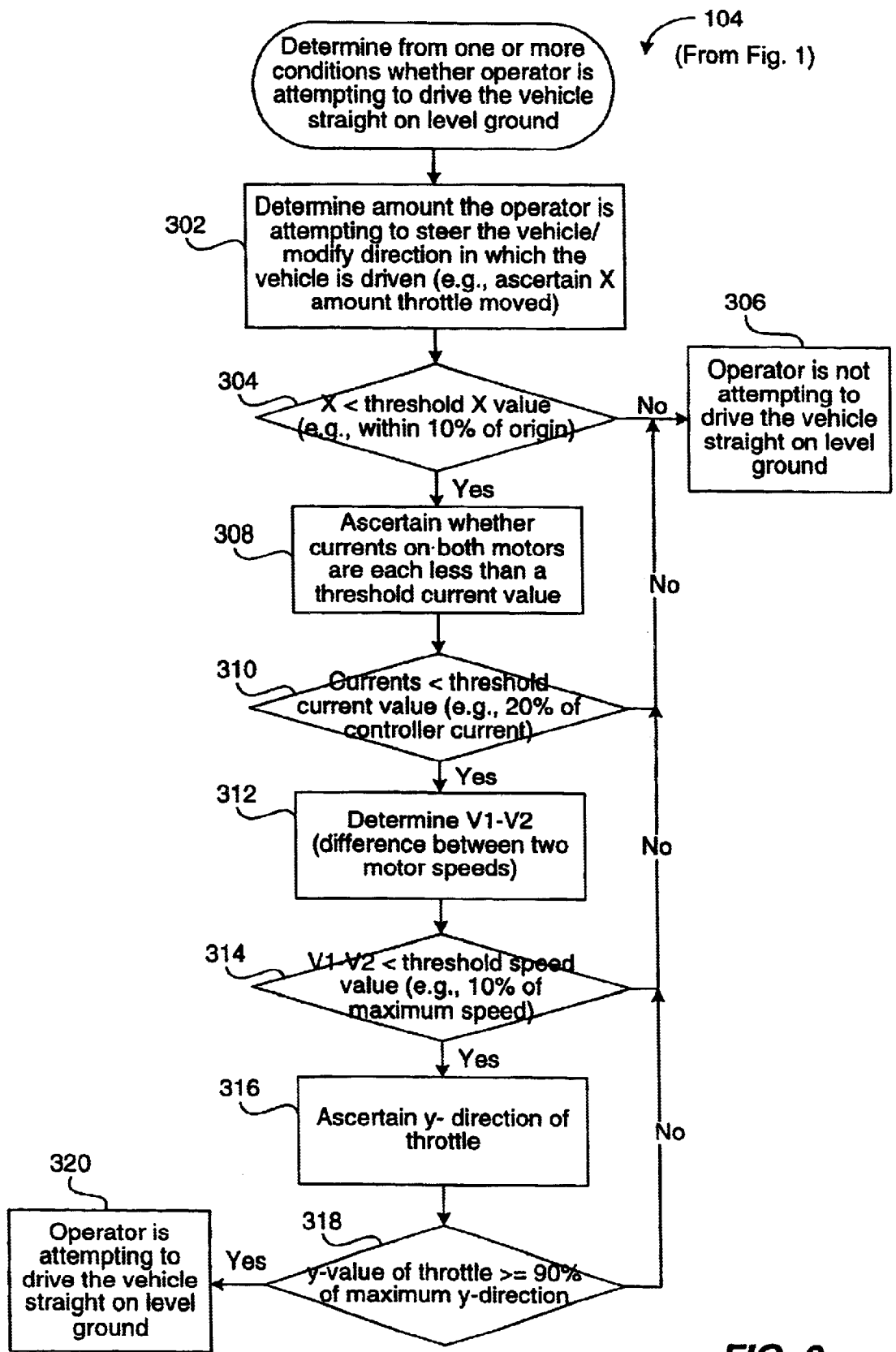
FIG. 3 is a process flow diagram illustrating one method of detecting when operator is attempting to drive straight on flat ground as shown at block 104 of FIG. 1.

As described above, the present invention may be "fooled" by environmental conditions (e.g., driving around an arc-shaped park) that indicate that the operator of the vehicle is attempting to drive straight on level ground. As a result, several conditions are preferably simultaneously satisfied to reduce the likelihood that such a determination is incorrect. FIG. 3 is a process flow diagram illustrating one method of detecting when the operator is attempting to drive straight on flat ground as shown at block 104 of FIG. 1. As shown at block 302, an amount that the operator is attempting to steer the vehicle or otherwise modify a direction in which the vehicle is driven is ascertained. More particularly, an amount that the user control is adjusted along the x-axis is ascertained. As described above, the user control is positioned at the origin of the x-axis when the vehicle is being driven approximately straight. When the amount that the user control is adjusted along the x-axis is within a predetermined threshold x value (e.g., within 10% of the origin), this suggests that the operator is attempting to drive the vehicle straight rather than turning the vehicle. Thus, when the amount that the user control is adjusted along the x-axis is not determined to lie within this range of values at block 304, the operator is not attempting to drive the vehicle straight on approximately level ground, as shown at block 306.

It is also important that the vehicle be driven on substantial level ground. When the vehicle is driven on level ground, there will not be a significant load on either of the wheels. Even when the vehicle is being driven on level ground, there may be an uneven weight distribution on the vehicle due to a variety of reasons including, but not limited to, physical characteristics of the operator of the vehicle, disabilities of the operator of the vehicle, and the positioning of the operator of the vehicle with respect to the center of the vehicle. Thus, at block 308 it is ascertained whether the current on each of the motors is less than a threshold current value. For instance, the threshold current value may be a specified percentage (e.g., 20%) of a current supplied by a motor controller. If both currents are not determined to be less than this threshold current value at block 310, the vehicle is not being driven on level ground, as shown at block 306. Otherwise, the process continues for the remaining conditions.

The difference in motor speeds may also indicate whether the operator is driving the vehicle straight on level ground. Thus, at block 312 the difference between speeds of the motors is ascertained. Next, at block 314 it is determined whether the difference between the speeds of the motors is less than a threshold speed value. For instance, the threshold speed value may be a specified percentage (e.g., 10%) of a maximum speed at which each of the motors is capable of functioning. When the difference between the speeds is not less than this threshold speed value, the operator is not attempting to drive the vehicle straight on level ground. Otherwise, the process continues at block 316.

When the operator of the vehicle operates the vehicle at substantially full speed, this may indicate that the operator of the vehicle intends to drive the vehicle straight. Thus, at block 316 an amount along a y-axis in which the user control is adjusted is ascertained. In this manner, a speed in which the operator of the vehicle intends to drive the vehicle may be approximated. At block 318 it is determined whether the amount along the y-axis in which the user control is adjusted is within a specified percentage (e.g., 90%) of a maximum amount along the y-axis in which the user control can be adjusted. If the amount is greater or equal to this amount, the operator is attempting to drive the vehicle straight and therefore the operator has been determined to be attempting to drive the vehicle straight on level ground as shown at block 320.

Although four different conditions are described with reference to this figure, it is important to recognize that other conditions may also be used. In addition, fewer or greater conditions may be used to determine when an operator is attempting to drive straight on approximately level ground. Moreover, each condition may be applied separately as well as in combination with one another.

The present invention operates automatically and dynamically to compensate for various conditions that may be detected. For example, the present invention has the capability to compensate for a mismatch between motors. As a result, the operator of the vehicle need not have the mental or physical ability to continually compensate for the failure of the vehicle to respond in an expected manner. Through the implementation of a dynamically modifiable variable, the present invention may be used instead of or in addition to the conventional static trim variable. Accordingly, the present invention gradually modifies vehicle operation in response to input from a user control. In this manner, the vehicle compensates for undesirable operating conditions without requiring the operator to continually and consciously modify his or her input to the user control.

Figure 4:
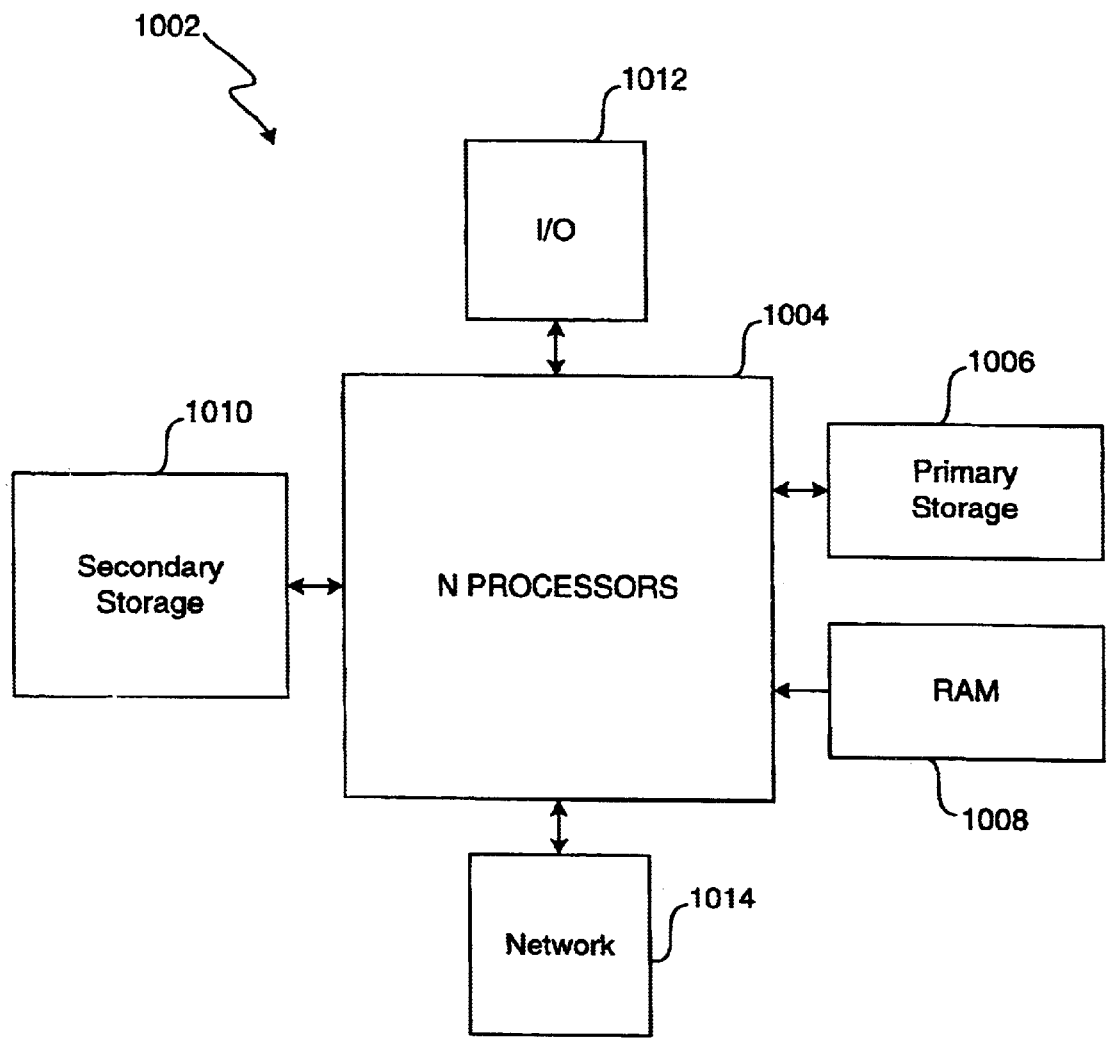
FIG. 4 is a system diagram illustrating a computer system in which the present invention may be implemented for use with an electrically driven vehicle.

The present invention may be implemented on any suitable computer system. FIG. 4 illustrates a typical, generalpurpose computer system 1002 suitable for implementing the present invention. The computer system may take any suitable form. For example, the computer system may be integrated with a motor controller.

Computer system 1030 or, more specifically, CPUs 1032, may be arranged to support a motor controller, as will be appreciated by those skilled in the art. The computer system 1002 includes any number of processors 1004 (also referred to as central processing units, or CPUs) that may be coupled to memory devices including primary storage device 1006 (typically a read only memory, or ROM) and primary storage device 1008 (typically a random access memory, or RAM). As is well known in the art, ROM acts to transfer data and instructions uni-directionally to the CPUs 1004, while RAM is used typically to transfer data and instructions in a bi-directional manner. Both the primary storage devices 1006, 1008 may include any suitable computer-readable media. The CPUs 1004 may generally include any number of processors.

A secondary storage medium 1010, which is typically a mass memory device, may also be coupled bi-directionally to CPUs 1004 and provides additional data storage capacity. The mass memory device 1010 is a computer-readable medium that may be used to store programs including computer code, data, and the like. Typically, the mass memory device 1010 is a storage medium such as a hard disk which is generally slower than primary storage devices 1006, 1008.

The CPUs 1004 may also be coupled to one or more input/output devices 1012 that are used as a user control to steer the vehicle, which may include, but are not limited to, devices such as throttles, joysticks, track balls, mice, keyboards, microphones, touch-sensitive displays, tablets, styluses, voice recognizers, or other well-known input devices such as, of course, other computers. Finally, the CPUs 1004 optionally may be coupled to a computer or telecommunications network, e.g., an internet network or an intranet network, using a network connection as shown generally at 1014. With such a network connection, it is contemplated that the CPUs 1004 might receive information from the network, or might output information to the network in the course of performing the above-described method steps. Such information, which is often represented as a sequence of instructions to be executed using the CPUs 1004, may be received from and outputted to the network, for example, in the form of a computer data signal embodied in a carrier wave.

The present invention provides automatic detection as well as automatic motor adjustment. However, the present invention may also inform an operator of the need for adjustment by providing an indicator (e.g., light, beeper, display) of the detected condition. The operator may then initiate the motor adjustment manually. For instance, the operator may indicate the motor requiring adjustment as well as the amount of adjustment required. Alternatively, the adjustment may be performed "automatically" once initiated by the operator of the vehicle.

The controller of the present invention may generally be implemented on any suitable computer system (e.g., microprocessor). In addition, the present invention may be implemented as computer-readable instructions stored on any suitable computer-readable media.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described a dual motor system, more than two motors may be used. Moreover, the present invention may be used in a system employing a various types of motors. Accordingly, the present embodiments are to be considered as illustrative and not restrictive, and the invention is not to be limited to the details given herein, but may be modified within the scope and equivalents of the appended claims.

What is claimed is:

1. In an electrically driven vehicle having a first motor for controlling a first wheel and a second motor for controlling a second wheel, a method of adjusting at least one of the motors in response to input from a user control that enables an operator of the vehicle to steer the vehicle, the method comprising:

determining from one or more conditions whether the operator of the vehicle is attempting to drive the vehicle straight on approximately level ground; and when it is determined from the one or more conditions that the operator of the vehicle is attempting to drive the vehicle approximately straight on approximately level ground, determining whether to adjust one of the motors based upon the input from the operator of the vehicle to the user control.

2. The method as recited in claim 1, further comprising:

when it is determined to adjust one of the motors based upon the input from the operator of the vehicle to the user control, providing an indicator to the operator of the vehicle, thereby notifying the operator of the vehicle that adjustment of one of the motors is required.

3. The method as recited in claim 2, further comprising:

receiving input from the operator of the vehicle, the input indicating one of the motors requiring adjustment; and adjusting one of the motors in response to the input.

4. The method as recited in claim 3, wherein the input from the operator of the vehicle further indicates an amount of adjustment required.

5. In an electrically driven vehicle having a first motor for controlling a first wheel and a second motor for controlling a second wheel, a method of adjusting at least one of the motors in response to input from a user control that enables an operator of the vehicle to steer the vehicle, the method comprising:

determining from one or more conditions whether the operator of the vehicle is attempting to drive the vehicle straight on approximately level ground;

when it is determined from the one or more conditions that the operator of the vehicle is attempting to drive the vehicle approximately straight on approximately level ground, determining whether to adjust one of the motors based upon the input from the operator of the vehicle to the user control; and when it is determined to adjust of one of the motors, adjusting one of the motors.

6. The method as recited in claim 5, wherein adjusting one of the motors comprises:

adjusting a speed of one of the motors.

7. The method as recited in claim 5, wherein adjusting one of the motors comprises:

adjusting an input to one of the motors.

8. The method as recited in claim 7, wherein adjusting an input to one of the motors comprises adjusting a voltage applied to one of the motors.

9. The method as recited in claim 5, further comprising:
determining which one of the motors to correct.

10. The method as recited in claim 5, further comprising:
determining an amount to correct one of the motors.

11. The method as recited in claim 5, further comprising:
ascertaining a differential current, the differential current being a difference between a current running through the first motor and the current running through the second motor.

12. The method as recited in claim 11, wherein ascertaining a differential current comprises obtaining a plurality of current samples for the first and second motors over a period of time.

13. The method as recited in claim 11, wherein adjusting one of the motors comprises:
correcting one of the motors based upon the differential current.

14. The method as recited in claim 5, wherein the input from the operator of the vehicle to the user control is a position of the user control.

15. The method as recited in claim 5, wherein determining whether adjustment of one of the motors is necessary based upon the input from the operator of the vehicle to the user control comprises:
ascertaining a position of the user control.

16. The method as recited in claim 15, wherein determining whether adjustment of one of the motors is necessary based upon the input from the operator of the vehicle to the user control comprises:
ascertaining whether the position of the user control exceeds a threshold value.

17. The method as recited in claim 15, wherein ascertaining a position of the user control comprises:
ascertaining a position of the user control along an x-axis with respect to an origin of the x-axis, the user control being in a steady state at the origin of the x-axis.

18. The method as recited in claim 17, wherein the vehicle drives approximately straight when the position of the user control along the x-axis is the origin of the x-axis.

19. The method as recited in claim 17, further comprising:
maintaining a counter indicating one or more positions of the user control along the x-axis over a period of time.

20. The method as recited in claim 19, wherein determining whether adjustment of one of the motors is necessary further comprises:
determining whether the counter exceeds a threshold value.

21. The method as recited in claim 20, wherein the threshold value represents a percentage of a maximum value along the x-axis.

22. The method as recited in claim 19, wherein adjusting one of the motors comprises:
detecting an electromechanical brake release; and
when an electromechanical brake release is detected, adjusting an input to one of the motors and resetting the counter to zero.

23. The method as recited in claim 20, wherein adjusting one of the motors comprises:
detecting an electromechanical brake release; and
when an electromechanical brake release is detected, adjusting an input to one of the motors and resetting the counter to zero.

24. The method as recited in claim 15, further comprising:
modifying a counter in response to operator-input obtained via the user control; and
wherein determining whether to adjust one of the motors comprises determining whether the counter exceeds a threshold value.

25. The method as recited in claim 15, further comprising:
maintaining a counter indicating one or more positions of the user control over a period of time.

26. The method as recited in claim 25, wherein the counter indicates an amount and direction of movement of the user control.

27. The method as recited in claim 25, further comprising:
initializing the counter to indicate that the operator of the vehicle has not attempted to modify a direction in which the vehicle is advancing.

28. The method as recited in claim 25, wherein determining whether to adjust one of the motors further comprises:
determining whether the counter exceeds a threshold value.

29. The method as recited in claim 28, wherein when it is determined that the counter exceeds the threshold value, the vehicle is not responding within a specified margin of error.

30. The method as recited in claim 28, wherein when it is determined that the counter exceeds the threshold value, the operator of the vehicle is attempting to drive the vehicle approximately straight.

31. The method as recited in claim 28, wherein adjusting one of the motors comprises:
detecting an electromechanical brake release; and
adjusting an input to one of the motors in response to the detection of the electromechanical brake release; and
resetting the counter to zero when the counter is determined to exceed the threshold value.

32. The method as recited in claim 25, wherein when it is determined from the one or more conditions that the operator of the vehicle is not attempting to drive the vehicle straight on approximately level ground, storing the counter.

33. The method as recited in claim 32, wherein the counter is stored until it is determined from the one or more conditions that the operator of the vehicle is attempting to drive straight on approximately level ground.

34. The method as recited in claim 32, wherein the stored counter is retrieved when it is determined from the one or more conditions that the operator of the vehicle is attempting to drive straight on approximately level ground.

35. The method as recited in claim 25, wherein adjusting one of the motors comprises:
adjusting an input to one of the motors; and
resetting the counter to zero.

36. The method as recited in claim 25, wherein adjusting one of the motors comprises:
detecting an electromechanical brake release; and
adjusting an input to one of the motors in response to the detection of the electromechanical brake release; and
resetting the counter to zero.

37. The method as recited in claim 5, wherein adjusting one of the motors is performed in response to detection of an electromechanical brake release.

38. The method as recited in claim 5, wherein adjusting one of the motors is performed a single time in response to detection of an electromechanical brake release.

39. The method as recited in claim 5, further comprising:
detecting whether the operator of the vehicle has initiated an electromechanical brake release; and
wherein adjusting one of the motors comprises reducing voltage applied to the motor in response to the detection of an electromechanical brake release.

40. The method as recited in claim 5, wherein determining from one or more conditions whether the operator of the vehicle is attempting to drive the vehicle straight on approximately level ground comprises:

determining an amount that the operator of the vehicle is attempting to steer the vehicle.

41. The method as recited in claim 5, wherein determining from one or more conditions whether the operator of the vehicle is attempting to drive the vehicle straight on approximately level ground comprises:

determining an amount that the operator of the vehicle is attempting to modify a direction in which the vehicle is driven.

42. The method as recited in claim 41, wherein the determining step comprises:

ascertaining an amount along an axis that the user control is adjusted.

43. The method as recited in claim 42, further comprising:

determining whether the amount along the axis is within a predetermined percentage of an origin of the axis, the user control being positioned at the origin when the vehicle is being driven approximately straight.

44. The method as recited in claim 42, further comprising:

determining whether the amount along the x-axis is less than a threshold value, thereby indicating that the operator of the vehicle is attempting to drive the vehicle straight.

45. The method as recited in claim 5, wherein determining from one or more conditions whether the operator of the vehicle is attempting to drive the vehicle straight on approximately level ground comprises:

determining whether currents on both motors are each less than a threshold current value.

46. The method as recited in claim 45, wherein the threshold current value is a specified percentage of a current supplied by a motor controller.

47. The method as recited in claim 5, wherein determining from one or more conditions whether the operator of the vehicle is attempting to drive the vehicle straight on approximately level ground comprises:

ascertaining a difference between speeds of the motors;

determining whether the difference between the speeds of the motors is less than a threshold speed value.

48. The method as recited in claim 47, wherein the threshold speed is a specified percentage of a maximum speed at which each of the motors is capable of functioning.

49. The method as recited in claim 5, wherein determining from one or more conditions whether the operator of the vehicle is attempting to drive the vehicle straight on approximately level ground comprises:

determining a speed in which the operator of the vehicle intends to drive the vehicle.

50. The method as recited in claim 5, wherein determining from one or more conditions whether the operator of the vehicle is attempting to drive the vehicle straight on approximately level ground comprises:

ascertaining an amount along a y-axis in which the user control is adjusted.

51. The method as recited in claim 50, further comprising:

determining whether the amount along the y-axis in which the user control is adjusted is within a specified percentage of a maximum amount along the y-axis in which the user control can be adjusted.

52. A motor controller for use in an electrically driven vehicle having a first motor for controlling a first wheel and a second motor for controlling a second wheel, the motor controller being adapted for adjusting at least one of the motors in response to input from a user control that enables an operator of the vehicle to steer the vehicle, the motor controller comprising:

a processor; and a memory, at least one of the processor and the memory being adapted for performing the following steps:

determining from one or more conditions whether the operator of the vehicle is attempting to drive the vehicle straight on approximately level ground; and when it is determined from the one or more conditions that the operator of the vehicle is attempting to drive the vehicle approximately straight on approximately level ground, determining whether to adjust one of the motors based upon the input from the operator of the vehicle to the user control.

53. A computer-readable medium storing thereon computer-readable instructions for performing a method in an electrically driven vehicle having a first motor for controlling a first wheel and a second motor for controlling a second wheel of adjusting at least one of the motors in response to input from a user control that enables an operator of the vehicle to steer the vehicle, comprising:

instructions for determining from one or more conditions whether the operator of the vehicle is attempting to drive the vehicle straight on approximately level ground; and instructions for determining whether to adjust one of the motors based upon the input from the operator of the vehicle to the user control when it is determined from the one or more conditions that the operator of the vehicle is attempting to drive the vehicle approximately straight on approximately level ground.

54. An apparatus adapted for adjusting at least one of a first motor for controlling a first wheel and a second motor for controlling a second wheel in an electrically driven vehicle in response to input from a user control that enables an operator of the vehicle to steer the vehicle, comprising:

means for determining from one or more conditions whether the operator of the vehicle is attempting to drive the vehicle straight on approximately level ground; and means for determining whether to adjust one of the motors based upon the input from the operator of the vehicle to the user control when it is determined from the one or more conditions that the operator of the vehicle is attempting to drive the vehicle approximately straight on approximately level ground.

* * * * *